United States Patent [19]

Tsutsumi

[11] Patent Number: 4,718,030
[45] Date of Patent: Jan. 5, 1988

[54] INTERPOLATED VALUE COMPUTING DEVICE FOR A WAVEFORM GENERATED IN AN ELECTRONIC DEVICE

[75] Inventor: Kenichi Tsutsumi, Tachikawa, Japan

[73] Assignee: Casio Computer Co., Ltd., Tokyo, Japan

[21] Appl. No.: 684,706

[22] Filed: Dec. 21, 1984

[30] Foreign Application Priority Data

Jan. 7, 1984 [JP] Japan ................................. 59-1104

[51] Int. Cl.$^4$ .......................... G06F 1/02; G06F 7/38
[52] U.S. Cl. .................................... 364/721; 364/723
[58] Field of Search ................ 364/718, 721, 723, 729

[56] References Cited

U.S. PATENT DOCUMENTS 4,001,565  1/1977  Kawai ................................. 364/723
4,482,974 11/1984  Kovalick ............................. 364/718

FOREIGN PATENT DOCUMENTS 0110120  9/1981  Japan ................................. 364/718
57-142698 9/1982  Japan .
1423281  2/1976  United Kingdom .

OTHER PUBLICATIONS

IEE Proc., vol. 129, pt. G. No., Feb. 1, 1982, pp. 19-25; "Programmable Waveform Generator Using Linear Interpolation with Multiplying D/A Convertors".

Primary Examiner—Gary V. Harkcom
Assistant Examiner—Long Thanh Nguyen
Attorney, Agent, or Firm—Frishauf, Holtz, Goodman & Woodward

[57] ABSTRACT

A device for computing interpolated values of a waveform generated in an electronic device, includes a memory for storing waveform data of a periodic sinusoidal wave, and an address signal generator for generating an address signal. The waveform data consists of sine wave data and cosine wave data. An address signal from the generator or a signal obtained by inverting the address signal (i.e., inverted address signal) is supplied to the memory. Upon receipt of the address signal, the memory reads out the sine wave data or the cosine wave data. Upon receipt of the inverted address signal, it reads out the remaining wave data. The wave data read from the memory is multiplied by a multiplier, which produced an interpolated value. An adder adds this value to the sine or consine wave data read out from the memory when the inverted address signal is supplied to the memory, and computes amplitude value data corresponding to the address signal.

13 Claims, 7 Drawing Figures

NUMBER OF ADDRESSES $2^N$
MEMORY STEPS $2^n$

INTERPOLATED VALUE COMPUTING DEVICE FOR A WAVEFORM GENERATED IN AN ELECTRONIC DEVICE

BACKGROUND OF THE INVENTION

The present invention relates to a device for computing interpolated values for a waveform, digitally generated in an electronic device, by using only amplitude values of the waveform.

A variety of devices for digitally generating waveforms have been developed. Particularly in the field of electronic musical instruments, it is frequently required to generate a sine wave or a cosine wave. In such a case, the wave data are initially stored in a ROM (read only memory). The ROM is addressed to read out the waveform data therefrom. In a waveform generating device as disclosed in Kokai No. 57/142698, the amplitude value of a sine wave or a cosine wave at a predetermined sampling point, and the difference between this amplitude value and the amplitude value at a sampling point adjacent to the former point, are stored in a ROM. The difference of the amplitude values is subjected to a linear approximation in a multiplier to obtain interpolated values. The interpolated value thus obtained is used for gaining an amplitude value at a mid point between the sampling points. In storing the sine waveform data or the cosine waveform data in the ROM, the lesser amount of the data to be stored, the better. Nevertheless, in the conventional device, two types of data, i.e., the amplitude value data and the difference data, must be stored; therefore, the memory capacity of the ROM is increased.

SUMMARY OF THE INVENTION

Accordingly, an object of the present invention is to provide a device for computing interpolated values of a waveform, generated in an electronic device, by using only an amplitude value of a sine wave or a cosine wave as already stored in a ROM.

According to the present invention, there is provided a device for computing interpolated values of a waveform, generated in an electronic device. The device comprises: means for generating an address signal containing upper bits and lower bits; memory means for outputting at least ¼ period of one of two periodic sinusoidal waves including a sine wave and a cosine wave upon receipt of the upper bit signal of said address signal from said address signal generating means, and for outputting at least ¼ period of the other periodic sinusoidal wave upon receipt of a bit signal with an inverse logic level of said upper bit signal; computing means, connected to said address signal generating means and said memory means, for computing interpolated data by multiplying the lower bit signal from said address signal generating means and said other wave data outputted from said memory means; and computing means, connected to said memory means and said interpolated data computing means, for computing an amplitude value of the sinusoidal wave corresponding to an address signal from said address signal generating means, upon receipt of said one of periodic sinusoidal waves outputted from said memory means and the interpolated data computed by said interpolated data computing means.

In the interpolating value computing apparatus thus arranged, the waveform data stored in the memory may be only the amplitude value of a periodic sinusoidal wave. A memory capacity of the memory may be lessened. An interpolated data is computed using the data read out from the memory, thus to obtain an amplitude value of the sinusoidal wave at a predetermined address point.

DETAILED DESCRIPTION OF THE PREFERRED EMBODIMENTS

Figure 1:
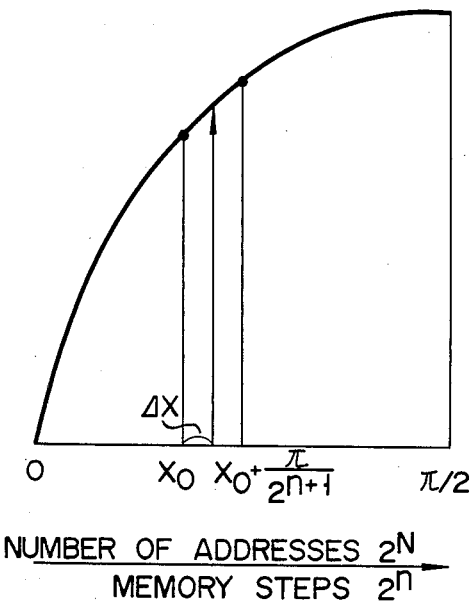
FIG. 1 shows a graph illustrating a relationship between amplitude values at predetermined address points of a sine wave and an interpolated value, which is useful in explaining an embodiment of the present invention.

The principle of an embodiment of the present invention will be described referring to FIG. 1. FIG. 1 illustrates a quarter of a sine wave in the phase range from 0 to $\pi/2$. Let us consider a case where the sine wave is specified at address points of $2^N$ (N is a natural number). In this case, it is assumed that the amplitude values of sine waves of only $2^n$ (N > n) are stored in a memory (a sine ROM to be given later).

An amplitude value of a sine wave in an address (designated as $Xo + \Delta X$) is the sum of an amplitude value of a sine wave at a sampling point (address $Xo$) of the memory and an interpolated value obtained at an address ($\Delta X$) at a mid point between the sampling point and another sampling point (address $Xo+1$) adjacent to the former in the memory.

The phase (radian) of the address $Xo + \Delta X$ is:

$$x = \frac{\pi}{2} \cdot \frac{Xo + \Delta X}{2^N} \qquad (1)$$

The amplitude value of a sine wave at this address is:

$$\sin x = \sin \frac{\pi}{2^{N+1}} (Xo + \Delta X) \qquad (2)$$

$$= \sin \frac{\pi}{2^{N+1}} Xo \cdot \cos \frac{\pi}{2^{N+1}} \Delta X +$$

$$\cos \frac{\pi}{2^{N+1}} Xo \cdot \sin \frac{\pi}{2^{N+1}} \Delta X.$$

If the following condition in equation (2) is met $$\frac{\pi}{2^{N+1}} \cdot \Delta X < < 1 \qquad (3)$$

-continued $$\cos \frac{\pi}{2^{N+1}} \Delta X \approx 1, \quad (4)$$

and $$\sin \frac{\pi}{2^{N+1}} \Delta X \approx \frac{\pi}{2^{N+1}} \Delta X. \quad (5)$$

hence, the equation (2) is rewritten into:

$$\sin x = \sin \frac{\pi}{2^{N+1}} Xo + \left( \frac{\pi}{2^{N+1}} \Delta X \right) \cdot \cos \frac{\pi}{2^{N+1}} Xo. \quad (6)$$

Equation (6) shows that the amplitude value at the address $Xo + \Delta X$ is the sum of the amplitude value $$\sin \frac{\pi}{2^{N+1}} Xo$$

of the sine wave at that time, and an interpolated value $$\left( \frac{\pi}{2^{N+1}} \Delta X \right) \cdot \cos \frac{\pi}{2^{N+1}} Xo.$$

As will be described later, $$\cos \frac{\pi}{2^{N+1}} Xo$$

can be obtained by logically inverting the address signal input to the memory to obtain an output of $$\sin \frac{\pi}{2^{N+1}} Xo$$

from a ROM. Accordingly, the operation of equation (6) can be realized by using an appropriate arithmetic/-logic circuit.

Let us consider an error caused when a sine wave is interpolated using equation (6). As seen from equations (4) and (5), $\Delta X$ satisfies the following relation:

$$0 \leq \frac{\pi}{2} \cdot \frac{\Delta X}{2^N} \leq \frac{\pi}{2^{n+1}} \quad (7)$$

$$0 \leq \Delta X \leq 2^{N-n}.$$

Then, the calculation errors are given by equations (8) and (9):

$$\epsilon \max(\cos) = 1 - \cos \frac{\pi}{2^{N+1}} \cdot 2^{N-n} \quad (8)$$

$$= 1 - \cos \frac{\pi}{2^{n+1}},$$

and $$\epsilon \max(\sin) = \frac{\pi}{2^{N+1}} \cdot 2^{N-n} - \sin \frac{\pi}{2^{N+1}} \cdot 2^{N-n} \quad (9)$$

$$= \frac{\pi}{2^{n+1}} - \sin \frac{\pi}{2^{n+1}}.$$

Therefore, a relationship between the number of memory steps $2^n$ of the sine wave ROM and the calculation errors of the equations (8) and (9) is as shown in Table 1.

TABLE 1

| n | Number of Memory Steps | $\epsilon$ max (cos) | $\epsilon$ max (sin) |
|---|---|---|---|
| 5 | $2^5 = 32$ | $1.204 \times 10^{-3}$ | $1.971 \times 10^{-5}$ |
| 6 | $2^6 = 64$ | $3.011 \times 10^{-4}$ | $2.464 \times 10^{-6}$ |
| 7 | $2^7 = 128$ | $7.529 \times 10^{-5}$ | $3.080 \times 10^{-7}$ |
|   |   | 13 bits $(= 0.0 \ldots 010)_2$ |   |

As seen from Table 1, as the number of memory steps is increased, the calculation errors become smaller. In the case of $n=7$, for example, if the amplitude value of the memory is represented by 13 bits or less, the errors are less than the quantitizing noise and are negligible from a practical viewpoint.

Figure 2:
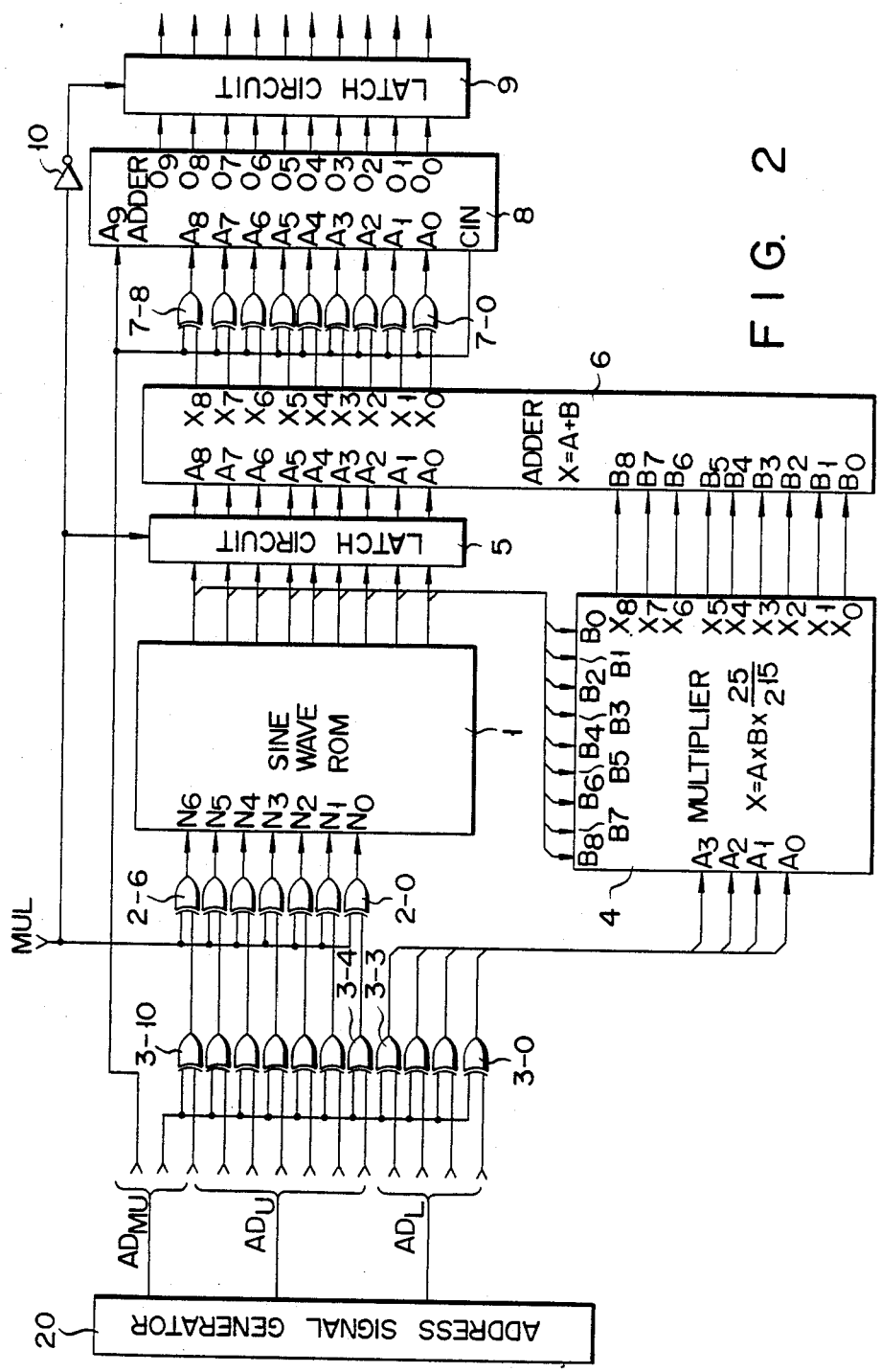
FIG. 2 shows a block diagram of a device for computing an interpolated value of a waveform for illustrating an embodiment of the present invention.

FIG. 2 shows a circuit arrangement of an embodiment of an interpolated value computing apparatus according to the present invention, which is constructed on the basis of the above-mentioned principle. In the figure, a sine wave ROM 1 stores sine wave data ranging from 0 to $\pi/2$ in the form of $2^7 (=128)$ points (i.e., $n=7$). The address input terminals N0–N6 of the sine wave ROM 1 are connected to an address signal, generated by an address signal generating circuit 20, through exclusive OR gates 2-0 to 2-6. The address signals ADu of the upper 7 bits or the inverted ones are connected to the exclusive OR gates 2-0 to 2-6 through exclusive OR gates 3-4 to 3-10, which are located at the preceeding stage of the exclusive OR gates 2-0 to 2-6. A signal MUL is applied to one of the input terminals of each of the exclusive OR gates 2-0 to 2-6. By the signal MUL, the exclusive OR gates 2-0 to 2-6 are controlled so as to invert the output signals of the exclusive OR gates 3-4 to 3-10. The output of these exclusive OR gates 3-4 to 3-10 is supplied to the exclusive OR gates 2-0 to 2-6.

Of the signals $AD_{Mu}$ of the two bits of the upper address signal ADu, the lower one bit is connected to the exclusive OR gates 3-4 to 3-10, and further to exclusive OR gates 3-0 to 3-3 supplied with the lower address signal $AD_L$.

The outputs of the exclusive OR gates 3-0 to 3-3 are respectively connected to input terminals A (A0 to A3) of a multiplier 4. The input terminals B (B0 to B8) of the multiplier 4 are coupled with the outputs of the sine wave ROM 1, respectively.

The multiplier 4 thus receives the data at the input terminals A and the input terminals B, and multiplies the data by $25/2^{15}$. In other words, the multiplier 4 performs the second term $$\frac{\pi}{2^{N+1}} \Delta X \cdot \cos \frac{\pi}{2^{N+1}} Xo$$

in equation (6) with N=11. That is:

$$\frac{\pi \cdot 2^3}{2^{15}} \Delta X \cdot \cos \frac{\pi}{2^{12}} XO \approx \frac{25}{2^{15}} \Delta X \cdot \cos \frac{\pi}{2^{12}} Xo.$$

The output signal from the sine wave ROM 1 is latched in a latch circuit 5 at the leading edge of the signal MUL. The contents of the latch circuit 5 are $\sin (\pi/2^{12}) Xo$, which is the first term in equation (6) when N=11.

The outputs of the latch circuit 5 and the multiplier 4 are applied to input terminals A (A0 to A8) and the input terminals B (B0 to B8) of the adder 6. The adder 6 adds those outputs together and applies the result of the addition to the input terminals A0 to A8 of an adder 8 through exclusive OR gates 7-0 to 7-8. The upper bit of the upper address signal $AD_{Mu}$, i.e., the most significant bit of the address signal, is connected to one of the input terminals of each of the exclusive OR gates 7-0 to 7-8. The most significant bit is further connected to the input terminal A9 and the carry input terminal CIN of the adder 8. The exclusive OR gates 7-0 and 7-8 and the adder 8 cooperate to invert all of the bits of the amplitude value, and add 1 to the inverted ones, that is, the output signals of the adder 6 with a minus sign, and output such signals at the output terminals O (O0 to O9) to a latch circuit 9.

Applied to the latch circuit 9 is the signal MUL as inverted by an inverter 10. At the leading edge of the inverted signal MUL, the latch circuit 9 latches the input data and holds it until it latches another data.

Figure 3:
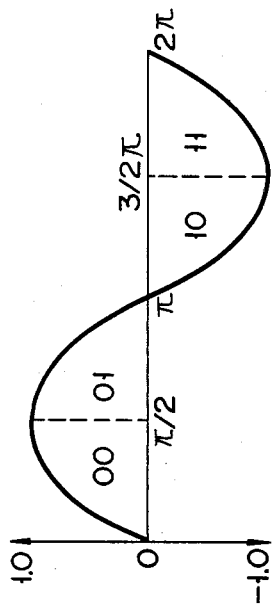
FIG. 3 shows a relationship between a sine wave and address signals corresponding to phases of the sine wave.

As described above, the upper address signal $AD_u$ is used for addressing the sine wave ROM 1, while the lower address signal $AD_L$ is for addressing and for making the interpolation. The most significant address signal $AD_{Mu}$ designates, with its two bits, each of the phase ranges 0 to $\pi/2$, $\pi/2$ to $\pi$ to $3\pi/2$, and $3\pi/2$ to $2\pi$ of a sine wave, as shown in FIG. 3.

Figure 4:
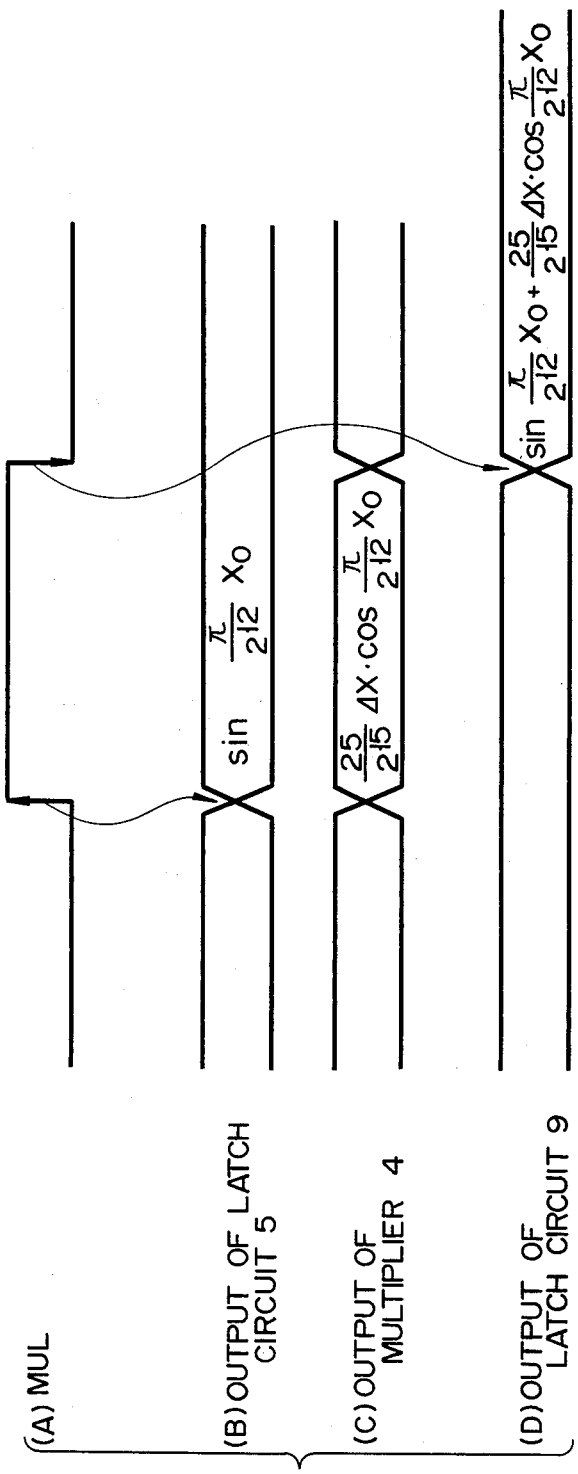
FIGS. 4(A) to 4(D) show timing charts useful in explaining the operation of the circuit of FIG. 2.

When the most significant address signal $AD_{Mu}$ is (0, 0), the exclusive OR gates 3-0 to 3-10 and 7-0 to 7-8 permit the signals applied thereto to pass through as they are. When the signal MUL is "0", the sine wave ROM 1 produces the sine wave data at that time, as shown in FIG. 4. That is, it produces $$\sin \frac{\pi}{2^{12}} Xo$$

with the upper address signal $AD_u$ of Xo. When the signal MUL changes its logical level to "1", the latch circuit 5 latches that value.

Upon receipt of the signal MUL of "1", the exclusive OR gates 2-0 to 2-6 are logically inverted, and the sine wave ROM 1 produces a signal of $$\cos \frac{\pi}{2^{12}} Xo$$

Then, the multiplier 4 multiplies the lower address signal $AD_L$ (i.e., $\Delta X$) coming through the input terminals A (A0 to A3) by the cosine wave data, further multiplies the product by the constant $25/2^{15}$, and produces the product thus obtained, i.e., $$25/2^{15}\Delta X \cdot \cos \frac{\pi}{2^{12}} Xo.$$

The output of the latch circuit 5 and the output of the multiplier 4 are supplied to the adder 6. The output signal of the adder 6, $$\sin \frac{\pi}{2^{12}} Xo + \frac{25}{2^{15}} \Delta X \cdot \cos \frac{\pi}{2^{12}} Xo,$$

is applied to the latch circuit 9 while not logically inverted. As the signal MUL changes its logical state to "0", the latch circuit 9 latches the output data from the adder 6.

The amplitude value thus obtained is:

$$\sin \frac{\pi}{2^{12}} Xo + \frac{25}{2^{15}} \Delta X \cdot = \cos \frac{\pi}{2^{12}} Xo \qquad (10)$$

When the most significant address signal $AD_{Mu}$ is (0, 1), viz., the phase of the sine wave ranges $\pi/2$ to $\pi$, the input signal is inverted by the exclusive OR gates 3-0 to 3-10. The sine wave ROM 1 is read out in the reverse direction to that when the most significant address signal $AD_{Mu}$ is (0, 0). Accordingly, the data finally stored in the latch circuit 9 is the amplitude value in the phase range from $\pi/2$ to $\pi$.

When the most significant address signal $AD_{Mu}$ is (1, 0), viz., the phase ranges from $\pi$ to $3\pi/2$, the exclusive OR gates 7-0 to 7-8 logically invert the output signal of the adder 8. A signal of "1" is applied to the most significant bit input and the carry input of the adder 8. The amplitude value stored in the latch circuit 9 is the inverted amplitude value for the 0 to $\pi/2$ phase range, i.e., a negative value.

When the most significant address signal $AD_{Mu}$ is (1, 1), or when the most significant address signal $AD_{Mu}$ is (1, 0), a "1" signal is applied to the exclusive OR gates 3-0 to 3-10. As a result, the address signals $AD_u$ and $AD_L$ are logically inverted, and the sign of the amplitude value of the sine wave whose phase ranges from $\pi/2$ to $\pi$ is inverted. Therefore, the amplitude value obtained takes a negative value.

While in the example sine wave data of ¼ period is stored in the sine wave ROM 1, sine wave data with ½ period or one period may be stored into the sine wave ROM 1. In the latter case, if the upper address signal is properly modified, for example, it is phase-shifted by $\pi/2$, a cosine wave is obtained. Additionally, individual ROMs may be provided for reading out the sine and cosine waves, respectively. However, the least memory capacity of the ROM is required in the above-mentioned embodiment where a sine wave of ¼ period is stored in the single ROM, and the ROM is used for both the sine and cosine wave readings.

Figure 5:
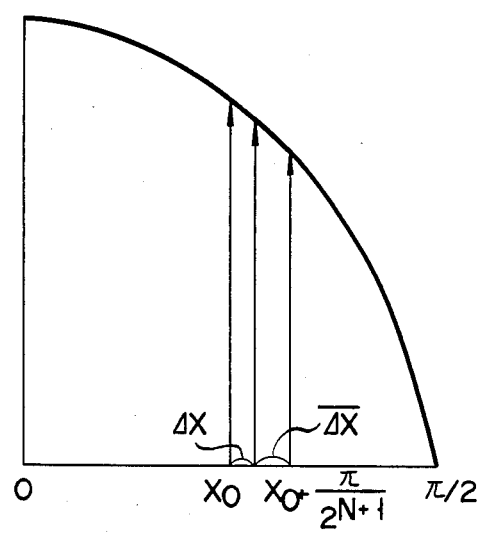
FIG. 5 shows a relationship between amplitude values at address points of a cosine wave and an interpolated value, for explaining another embodiment of the present invention.

A second embodiment of an interpolated value compensating apparatus according to the present invention will be described. In the second embodiment, a cosine wave of ¼ period, i.e., with a phase range from 0 to $\pi/2$, as shown in FIG. 5, is stored in the memory. Also in this embodiment, the cosine wave is specified at address points of $2^N$ (N is a natural number). The amplitude values of $2^n$ (n is a natural number and N>n) are stored in a memory (a cosine ROM to be described later).

The amplitude value at an address point (Xo+$\Delta X$) is obtained on the basis of the amplitude value at a sampling point (address Xo) of the memory and an interpolated value obtained at the address $\Delta X$. Also in this case, the sine wave and the cosine wave are read out from the cosine ROM for calculating an amplitude value, as will be described later.

The phase (radian) of the address Xo+$\Delta X$ is:

$$x = \frac{\pi}{2} \cdot \frac{Xo + \Delta X}{2^N}. \qquad (11)$$

The amplitude value at the phase is:

$$\cos x = \cos \frac{\pi}{2^{N+1}} (Xo + \Delta X) \quad (12)$$

$$= \cos \frac{\pi}{2^{N+1}} Xo \cdot \cos \frac{\pi}{2^{N+1}} \Delta X -$$

$$\sin \frac{\pi}{2^{N+1}} Xo \cdot \sin \frac{\pi}{2^{N+1}} \Delta X.$$

$$\frac{\pi}{2^{N+1}} \cdot \Delta X << 1 \quad (13)$$

in equation (12), $$\cos \frac{\pi}{2^{N+1}} \Delta X \approx 1, \quad (14)$$

$$\sin \frac{\pi}{2^{N+1}} \Delta X \approx \frac{\pi}{2^{N+1}} \Delta X, \quad (15)$$

and the equation (12) is rewritten as:

$$\cos x = \cos \frac{\pi}{2^{N+1}} Xo - \frac{\pi \Delta X}{2^{N+1}} \cdot \sin \frac{\pi}{2^{N+1}} Xo. \quad (16)$$

Equation (16) shows that the amplitude value at the address $Xo + \Delta X$ is obtained if the amplitude value $$\cos \frac{\pi}{2^{N+1}} Xo$$

of the cosine wave and an interpolated value $$\frac{\pi \Delta X}{2^{N+1}} Xo \cdot \sin \frac{\pi}{2^{N+1}} Xo$$

are known.

Figure 6:
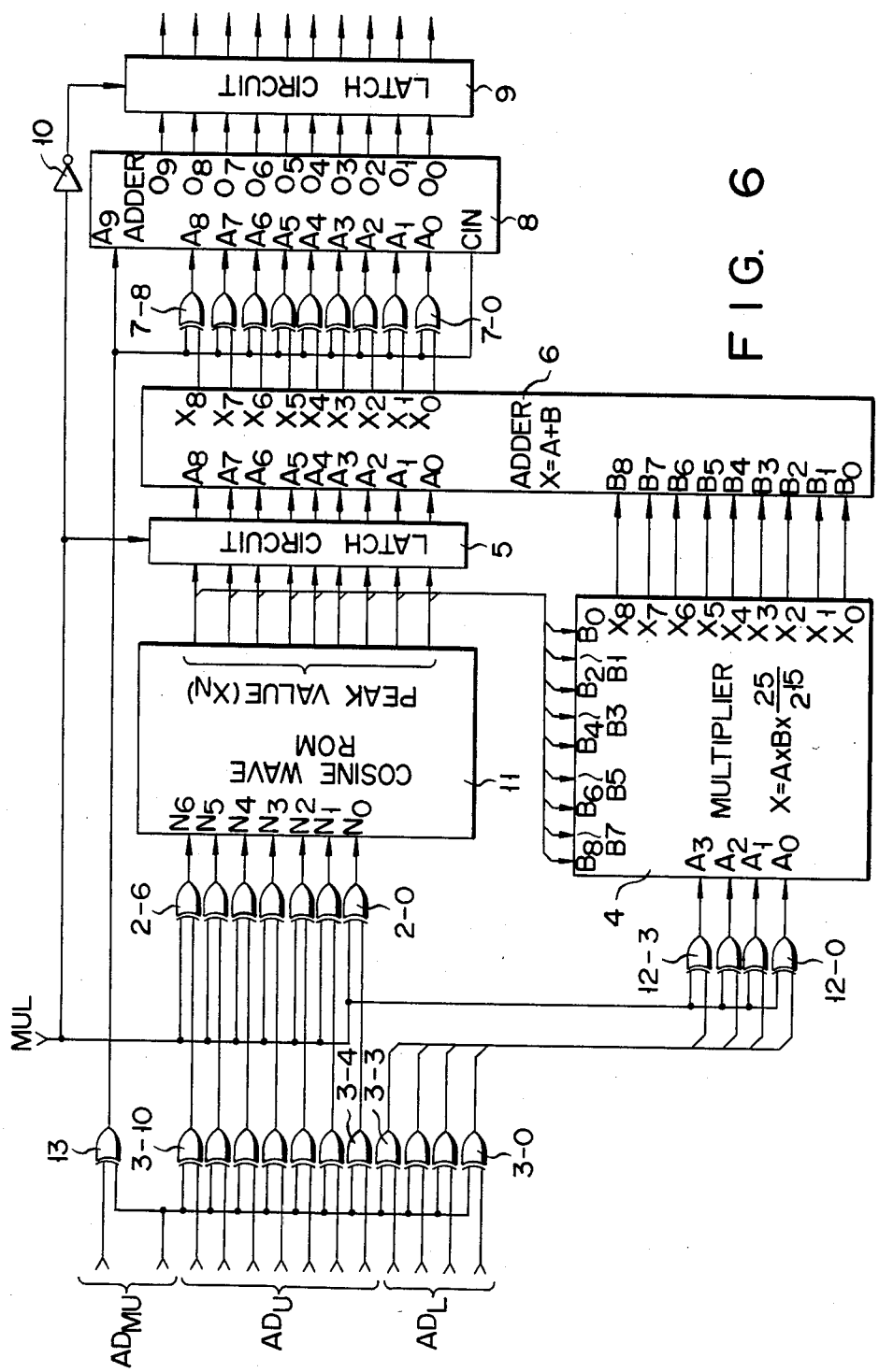
FIG. 6 shows a block circuit diagram of a device for computing interpolated values of a waveform, in another embodiment of the present invention.

FIG. 6 shows a circuit arrangement when $N=11$ and $n=7$. In the figure, like reference numerals are used for simplicity to designate like portions in FIG. 2.

A cosine wave ROM 11 stores a cosine wave data with a phase range from 0 to $\pi/2$. Exclusive OR gates 2-0 to 2-6 apply an address signal to the cosine wave ROM 11. A signal MUL is applied to those exclusive OR gates. The signal MUL is also supplied to exclusive OR gates 12-0 to 12-3 located prior to the input terminals A (Ao to A3) of the multiplier 4. The exclusive OR gates 12-0 to 12-3 are connected to the lower address signal $AD_L$ through the exclusive OR gates 3-0 to 3-3.

Figure 7:
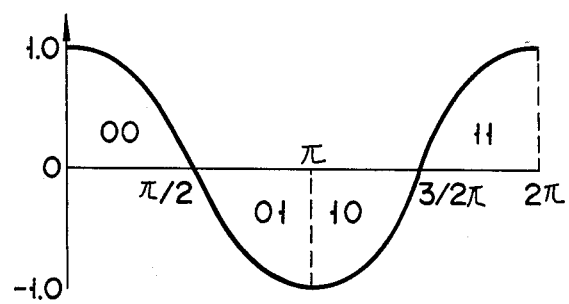
FIG. 7 shows a relationship between a cosine wave and address signals corresponding to phases of the cosine wave.

In the present embodiment, the two bits of the most significant address signal $AD_{Mu}$ are supplied to an exclusive OR gate 13, and then applied to the exclusive OR gates 7-0 to 7-8, and further, as the least significant bit and a carry input, to the adder 8. By the two bits of the most significant address signal $AD_{Mu}$, one of the phases shown in FIG. 7 is specified. A combination (0, 0) of the two bits specifies 0 to $\pi/2$. (0, 1) specifies $\pi/2$ to $\pi$; (1, 0), $\pi$ to $3\pi/2$; (1, 1), $3\pi/2$ to $2\pi$. In the present embodiment, when the address signal $AD_{Mu}$ is (0, 1), the address signals ADu and $AD_L$ are logically inverted to read out the cosine wave. Then, its sign is inverted to have a negative amplitude value. At this time, a "1" signal is applied to the exclusive OR gates 3-0 to 3-10. The output signal from the exclusive OR gate 13 is "1".

When the most significant address signal $AD_{Mu}$ is (1, 0), the output signal of the exclusive OR gate 13 is set at "1" to obtain a negative amplitude value. When the most significant address signal $AD_{Mu}$ is (1, 1), the address signals ADu and $AD_L$ are inverted to read out a cosine wave.

In the present embodiment, during the phase range 0 to $\pi/2$, a signal of $$\cos \frac{\pi}{2^{12}} Xo$$

is stored in the latch circuit 5 at the leading edge of the signal MUL. The output signal from the multiplier 4, when the signal MUL is "1" in level, is:

$$\frac{25}{2^{15}} \overline{\Delta X} \cdot \sin \frac{\pi}{2^{12}} Xo,$$

where $\overline{\Delta X}$ is an inversion of the level of the lower address signal $AD_L$ ($\Delta X$), as shown in FIG. 5, and then is given as, $$\frac{25}{2^{15}} \overline{\Delta X} \cdot \sin \frac{\pi}{2^{12}} Xo = -\frac{25}{2^{15}} \Delta X \cdot \sin \frac{\pi}{2^{12}} Xo$$

In the above example, the lower address signal $AD_L$ is inverted and applied to the multiplier 4. However, the lower address signal $AD_L$ may be directly applied to the multiplier 4, and in the adder 6, the subtraction may be carried out on the interpolated value input to the input terminal B.

Accordingly, in this embodiment, by operating the following equation:

$$\cos \frac{\pi}{2^{12}} Xo + \frac{25}{2^{15}} \overline{\Delta X} \cdot \sin \frac{\pi}{2^{12}} Xo \quad (17)$$

an amplitude value as given below is obtained, $$\cos \frac{\pi}{2^{12}} Xo - \frac{25}{2^{15}} \Delta X \cdot \sin \frac{\pi}{2^{12}} Xo \quad (18)$$

Also in the present embodiment, the cosine data of ¼ period is stored in the cosine ROM 11. It is evident that the cosine data of ½ period or one period may be stored in the memory. Different memories may also be provided for reading out the cosine wave data and the sine wave data. However, the arrangement of the above mentioned embodiment requires the least amount of memory capacity of the ROM.

In the above-embodiment, an amplitude value is obtained at a specific address point in the sine or cosine wave. The interpolated value computing apparatus of the present invention is also applicable for an electronic musical instrument of the so called sine wave synthesizing type. In this type of musical instrument, a pitch frequency or the waveform data of higher harmonics are read out by successively changing the address, the data read out are mixed at a proportional rate, and finally an amplitude value is obtained. Furthermore, the present invention is applicable for various types of sound source systems based on a sine wave or a new waveform generating system as proposed by the assignee of the present patent application and disclosed in Kokai No. 59-111515.

Additionally, the present invention is applicable to electronic devices for generating various types of sound effects or rhythm sounds, or electronic devices for producing waveform signals for special purposes.

What is claimed is:

1. A device for computing interpolated values of a waveform generated in an electronic device, comprising:
   means for generating an address signal containing upper bits and lower bits;
   memory means for outputting first type wave data representing at least ¼ period of one of two periodic sinusoidal waves comprising a sine wave and a cosine wave, upon receipt of an upper bit signal of said address signal from said address signal generating means, and for outputting second type wave data representing at least ¼ period of the other periodic sinusoidal wave upon receipt of a bit signal obtained by a predetermined operation on said upper bit signal;
   interpolated data computing means, connected to said address signal generating means and said memory means, for computing interpolated data by multiplying the lower bit signal from said address signal generating means and said second type wave data outputted from said memory means; and
   amplitude value computing means, connected to said memory means and said interpolated data computing means, for computing an amplitude value of the sinusoidal wave, corresponding to an address signal from said address signal generating means, upon receipt of said first type wave data outputted from said memory means and the interpolated data computed by said interpolated data computing means according to said second type wave data outputted from said memory means.

2. A device for computing interpolated values of a waveform generated in an electronic device, comprising:
   means for generating an address signal containing upper bits and lower bits;
   memory means for storing waveform data of at least ¼ period of a sine wave, for outputting sine wave data upon receipt of the upper bit signal of said address signal derived from said address signal generating means, and for outputting cosine wave data upon receipt of a bit signal obtained by a predetermined operation on said upper bit signal;
   interpolated data computing means, connected to said address signal generating means and said memory means, for computing interpolated data by multiplying the lower bit signal from said address signal generating means and said cosine wave data read out of said memory means; and
   amplitude value computing means, connected to said memory means and said interpolated data computing means, for computing an amplitude value of the sine wave, corresponding to an address signal from said address signal generating means, upon receipt of said sine wave data read out from said memory means and the interpolated data computed by said interpolated data computing means.

3. The device according to claim 2, wherein said address signal generating means generates an address signal to specify a sine wave in the phase range from 0 to $\pi/2$ at address points of $2^N$ (N is a natural number);
   said memory means stores the sine wave of the phase ranging from 0 to $\pi/2$ in the form of sine data at sampling points of $2^n$ (n is a natural number and n<N), and outputs sine wave data $$\sin \frac{\pi}{2^{N+1}} Xo$$

upon receipt of the upper bit signal of said address signal from said address signal generating means when said upper bit signal is Xo and said lower bit signal is $\Delta X$;
   said interpolated data computing means computes interpolating data $$\frac{\pi}{2^{N+1}} \Delta X \cdot \cos \frac{\pi}{2^{N+1}} Xo$$

upon receipt of the lower bit signal $\Delta X$ of said address signal and said cosine wave data $$\cos \frac{\pi}{2^{N+1}} Xo$$

read out from said memory means; and
   said amplitude value computing means computes amplitude value data $$\sin \frac{\pi}{2^{N+1}} Xo + \frac{\pi}{2^{N+1}} \Delta X \cdot \cos \frac{\pi}{2^{N+1}} Xo,$$

upon receipt of said sine wave data $$\sin \frac{\pi}{2^{N+1}} Xo,$$

read out from said memory means and said interpolating data $$\frac{\pi}{2^{N+1}} \Delta X \cdot \cos \frac{\pi}{2^{N+1}} Xo$$

computed by said interpolated data computing means.

4. A device for computing interpolated values of a waveform generated in an electronic device, comprising:
   address signal generating means for generating an address signal containing upper bits and lower bits;
   memory means for storing waveform data during at least ¼ period of a cosine wave, for reading out cosine wave data upon receipt of the upper bit signal of said address signal from said address signal generating means, and for outputting sine wave data upon receipt of a bit signal obtained by a predetermined operation on said upper bit signal;
   interpolated data computing means, connected to said address signal generating means and said memory means, for computing interpolated data by multiplying said lower bit signal from said address signal generating means and said sine wave data read out of said memory means; and
   amplitude data computing means, connected to said memory means and said interpolated data computing means, for computing amplitude value data of the cosine wave, corresponding to said address signal from said address signal generating means, upon receipt of said cosine data read out of said memory means and said interpolated data computed by said interpolated data computing means.

5. The device according to claim 4, wherein said address signal generating means generates an address signal to specify a cosine wave in the phase range from 0 to $\pi/2$ at address points of $2^N$ (N is a natural number);

said memory means stores the cosine wave of the phase ranging from 0 to $\pi/2$ in the form of cosine data at sampling points of $2^n$ (n is a natural number and n<N), and outputs cosine wave data $$\cos \frac{\pi}{2^{N+1}} Xo$$

upon receipt of the upper bit signal of said address signal from said address signal generating means when said upper bit signal is Xo and said lower bit signal is $\Delta X$;

said interpolated data computing means computes interpolating data $$-\frac{\pi}{2^{N+1}} \Delta X \cdot \sin \frac{\pi}{2^{N+1}} Xo$$

upon receipt of the lower bit signal $\Delta X$ of said address signal and said sine wave data $$\sin \frac{\pi}{2^{N+1}} Xo$$

read out from said memory means; and
said amplitude value computing means computes amplitude value data $$\cos \frac{\pi}{2^{N+1}} Xo - \frac{\pi}{2^{N+1}} \Delta X \cdot \sin \frac{\pi}{2^{N+1}} Xo,$$

upon receipt of said cosine wave data $$\cos \frac{\pi}{2^{N+1}} Xo,$$

read out from said memory means and said interpolating data $$-\frac{\pi}{2^{N+1}} \Delta X \cdot \sin \frac{\pi}{2^{N+1}} Xo$$

computed by said interpolated data computing means.

6. A device for computing interpolated values of a waveform generated in an electronic device, comprising:

means for generating an address signal containing upper bits and lower bits;

memory means for storing at least $\frac{1}{4}$ period of a selected one of two periodic sinusoidal waves comprising a sine wave and a cosine wave, for outputting a particular value of the selected one of the sinusoidal waves in response to a received upper bit signal of said address signal from said address signal generating means, and for outputting a particular value within at least $\frac{1}{4}$ period of the other sinusoidal wave in response to a received bit signal obtained through a predetermined operation on said upper bit signal;

incremental data computing means, connected to said address signal generating means and said memory means, for computing incremental data used in an interpolation by multiplying the lower bit signal from said address signal generating means and said other wave value outputted from said memory means; and amplitude value computing means, connected to said memory means and said incremental data computing means, for computing an amplitude value of the sinusoidal wave, corresponding to an address signal from said address signal generating means, by additively combining the selected one of the sinusoidal waves outputted from said memory means corresponding to the upper bit signal of the address signal, and the incremental data for interpolation computed by said incremental data computing means.

7. The device according to claim 6, wherein said memory means stores waveform data of $\frac{1}{4}$ period of a selected one of two periodic waves comprising a sine wave and a cosine wave, and outputs one of the waveform data corresponding to the received upper bit signal of said address signal from said address signal generating means, and outputs the other waveform data corresponding to a bit signal with an inverse logic level of said upper bit signal.

8. The device according to claim 6, wherein said memory means stores waveform data of $\frac{1}{2}$ period of a selected one of two sinusoidal waves comprising a sine wave and a cosine wave, and outputs one of the waveform data according to the received upper bit signal of said address signal, and outputs the other waveform data according to the bit signal obtained through said predetermined operation on the upper bit signal.

9. The device according to claim 6, wherein said memory means stores waveform data of one period of a selected one of two periodic sinusoidal waves comprising a sine wave and a cosine wave, and outputs one of the waveform data according to the received upper bit signal of said address signal and outputs the other waveform data according to the bit signal obtained through said predetermined operation on the upper bit signal.

10. A device for computing interpolated values of a waveform generated in an electronic device, comprising:

means for generating an address signal containing upper bits and lower bits;

memory means for storing waveform data of at least $\frac{1}{4}$ period of a sine wave, for outputting a particular value of the sine wave data in response to a received upper bit signal of said address signal derived from said address signal generating means, and for outputting a particular value of cosine wave data in response to a received bit signal obtained through a predetermined operation on said upper bit signal;

incremental data computing means, connected to said address signal generating means and said memory means, for computing incremental data used in an interpolation by multiplying the lower bit signal from said address signal generating means and said cosine wave data read out of said memory means; and amplitude value computing means, connected to said memory means and said incremental data computing means, for computing an amplitude value of the sine wave, corresponding to an address signal from said address signal generating means, by additively combining said sine wave data read out from said memory means corresponding to the upper bit signal of the address signal, and the incremental data for interpolation computed by said incremental data computing means.

11. The device according to claim 10, wherein said address signal generating means generates an address signal to specify a sine wave in the phase range from 0 to $\pi/2$ at address points of $2^N$ (N is a natural number); said memory means stores the sine wave of the phase ranging from 0 to $\pi/2$ in the form of sine data at sampling points of $2^n$ (n is a natural number and $n<N$), and outputs sine wave data $$\sin \frac{\pi}{2^{N+1}} X_o$$

upon receipt of the upper bit signal of said address signal from said address signal generating means when said upper bit signal is Xo and said lower bit signal is $\Delta X$;

said incremental data computing means computes incremental data $$\frac{\pi}{2^{N+1}} \Delta X \cdot \cos \frac{\pi}{2^{N+1}} X_o$$

upon receipt of the lower bit signal $\Delta X$ of salid address signal and said cosine wave data $$\cos \frac{\pi}{2^{N+1}} X_o$$

read out from said memory means; and
said amplitude value computing means computes amplitude value data sin $$\frac{\pi}{2^{N+1}} X_o + \frac{\pi}{2^{N+1}} \Delta X \cdot \cos \frac{\pi}{2^{N+1}} X_o,$$

upon receipt of said sine wave data $$\sin \frac{\pi}{2^{N+1}} X_o,$$

read out from said memory means and said incremental data $$\frac{\pi}{2^{N+1}} \Delta X \cdot \cos \frac{\pi}{2^{N+1}} X_o$$

computed by said incremental data computing means.

12. A device for computing interpolated values of a waveform generated in an electronic device, comprising:
  address signal generating means for generating an address signal containing upper bits and lower bits;
  memory means for storing waveform data of at least $\frac{1}{4}$ period of a cosine wave, for outputting a particular value of the cosine wave data in response to a received upper bit signal of said address signal derived from said address signal generating means, and for outputting a particular value of sine wave data in response to a received bit signal obtained through a predetermined operation on said upper bit signal;
  incremental data computing means, connected to said address signal generating means and said memory means, for computing incremental data used in the interpolation by multiplying said lower bit signal from said address signal generating means and said sine wave data read out of said memory means; and
  amplitude value computing means, connected to said memory means and said incremental data computing means, for computing amplitude value data of the cosine wave, corresponding to said address signal from said address signal generating means, by additively or subtractively combining said cosine data read out of said memory means corresponding to the upper bit signal of the address signal and said incremental data for interpolation computed by said interpolated data computing means.

13. The device according to claim 12, wherein said address signal generating means generates an address signal to specify a cosine wave in the phase range from 0 to $\pi/2$ at address points of $2^N$ (N is a natural number); said memory means stores the cosine wave of the phase ranging from 0 to $\pi/2$ in the form of cosine data at sampling points of $2^n$ (n is a natural number and $n<N$), and reads out cosine wave data $$\cos \frac{\pi}{2^{N+1}} X_o$$

upon receipt of the upper bit signal of said address signal from said address signal generating means when said upper bit signal is Xo and said lower bit signal is $\Delta X$;

said incremental data computing means computes at least one incremental data $$-\frac{\pi}{2^{N+1}} X \cdot \sin \frac{\pi}{2^{N+1}} X_o$$

and $$+\frac{\pi}{2^{N+1}} \overline{\Delta X} \cdot \sin \frac{\pi}{2^{N+1}} X_o$$

upon receipt of the lower bit signal $\Delta X$ of said address signal and said sine wave data $$\sin \frac{\pi}{2^{N+1}} X_o$$

read out from said memory means; and
said amplitude value computing means computes amplitude value data $$\cos \frac{\pi}{2^{N+1}} X_o - \frac{\pi}{2^{N+1}} \Delta X \cdot \sin \frac{\pi}{2^{N+1}} X_o,$$

upon receipt of said cosine wave data $$\cos \frac{\pi}{2^{N+1}} X_o,$$

read out from said memory means and at least one of said incremental data $$-\frac{\pi}{2^{N+1}} \Delta X \cdot \sin \frac{\pi}{2^{N+1}} X_o$$

and $$+\frac{\pi}{2^{N+1}} \overline{\Delta X} \cdot \sin \frac{\pi}{2^{N+1}} X_o$$

computed by said incremental data computing means.

* * * * *